United States Patent
Lee et al.

(10) Patent No.: US 6,338,748 B1
(45) Date of Patent: Jan. 15, 2002

(54) HYDROMETALLURGICAL METHOD FOR RECOVERY OF ZINC FROM ELECTRIC ARC FURNACE DUST

(75) Inventors: Ho In Lee; Dong Soo Baik; Hyeun Bum Jo, all of Seoul (KR)

(73) Assignee: Sangwon EnC Co., Gangseo-Gu (KR)

( * ) Notice: Subject to any disclaimer, the term of this patent is extended or adjusted under 35 U.S.C. 154(b) by 0 days.

(21) Appl. No.: 09/490,624

(22) Filed: Jan. 27, 2000

(30) Foreign Application Priority Data

Jan. 23, 1999 (KR) ............................................. 99-2135
Oct. 8, 1999 (KR) ............................................. 99-43558

(51) Int. Cl.⁷ ............................. C22B 3/42; C22B 19/30
(52) U.S. Cl. .......................... 75/725; 75/743; 205/606; 205/609; 423/109
(58) Field of Search ........................ 75/961, 743, 725; 423/109; 204/609, 606

(56) References Cited

U.S. PATENT DOCUMENTS

| | | | |
|---|---|---|---|
| 4,572,771 A | 2/1986 | Duyvesteyn et al. | 204/118 |
| 4,610,722 A | 9/1986 | Duyvesteyn et al. | 75/97 A |
| 5,336,297 A | 8/1994 | McElroy | 75/725 |
| 5,709,730 A | 1/1998 | Cashman | 75/10.63 |

FOREIGN PATENT DOCUMENTS

| | | | |
|---|---|---|---|
| DE | 14255 A1 | * | 8/1980 |
| EP | 935005 A1 | * | 8/1999 |

OTHER PUBLICATIONS

Derwent abstract 1980–58929C of EP 14255, Mueller et al Aug. 20, 1980 (two pages).*

* cited by examiner

*Primary Examiner*—Roy King
*Assistant Examiner*—Tima McGuthry Banks
(74) *Attorney, Agent, or Firm*—Steve Cha; Klauber & Jackson

(57) ABSTRACT

The process uses hydrochloric acid solutions to extract zinc from electric arc furnace dusts containing zinc oxide and zinc ferrite. To selectively leach zinc and minimize iron dissolution by precipitating as FeO.OH and $Fe_2O_3$, hot acid leaching with the aqueous solution containing 37 g/l–74 g/l HCl and 104 g/l–270 g/l $ZnCl_2$ is used. New dust is introduced to remove iron from the filtrate of the hot acid leaching. The zinc chloride solutions purified by activated carbon and metallic zinc powder is electrolysed in electrowinning cells which had cation exchange membrane to produce high purity zinc metal and to regenerate hydrochloric acid. Electrolysing an aqueous solution of zinc chloride with Zn concentration of 50–130 g/litre below 40° C. in a cell divided by cation exchange membrane, whereby coherent zinc is yielded at the cathode with high current efficiency of exceeding 90%. HCl is directly regenerated with a very small loss below 2% and low energy consumption below 5.0 kWh/kg-Zn during Zn-electrodeposition at a cathodic current density in the range of 300–2000 A/m², and a membrane current density in the range of 750–2000 A/m². The spent electrolyte with 1–2N HCl is used to leach the residue in the hot acid leaching vessel.

19 Claims, 3 Drawing Sheets

HYDROMETALLURGICAL METHOD FOR RECOVERY OF ZINC FROM ELECTRIC ARC FURNACE DUST

CLAIM OF PRIORITY

This application makes reference to, incorporates the same herein, and claims all benefits accruing under 35 U.S.C. Section 119 from an application for A HYDROMETALLURGICAL METHOD FOR RECOVERY OF ZINCC FROM ELECTRIC ARC FURNACE DUST filed earlier in the Korean Industrial Property Office on Jan. 23, 1999 and there duly assigned Ser. No. 2135/1999.

BACKGROUND OF THE INVENTION

1. Field of the Invention

The present invention relates to a method for the treatment of Electric Arc Furnace (EAF) dust so as to especially extract zinc.

2. Discussion of Related Art

A commonly used in the recycling of scrap metal containing zinc is the electric arc furnace (EAF) in which the scrap metal is melted by forming electric arcs between the graphite electrodes and the scrap metal. During the recycling process, zinc and other metals are evaporated as dust forming minute particles of the oxides. The dust typically contains 10–40% of zinc, 20–40% of iron, about 5% of lead, and others such as chrome, cadmium, copper, tin, manganese, quartz sand, alumina, limestone, sulfides, chlorides, etc.

Motivated by strict environmental regulations, the dust can be no longer simply disposed of as landfill because of the possible danger of contamination of soil and rivers by the hazardous metal components such as lead, copper, cadmium, etc., being leached out from the dust. Thus, it is important to treat the dust containing noxious heavy metals in a safe and economical manner, and many methods have been suggested to economize the expenses of the electric arc furnace dust disposal by extracting and recycling zinc from the electric arc furnace dust.

Pyrometallurgical and hydrometallurgical techniques are well known methods for extracting zinc from the electric arc furnace dust.

At the cost of high extraction yield of zinc from the dust, the pyrometallurgical processes require reduction agent of high cost—such as cokes—and high temperature ambience. The pyrometallurgical processes further require expensive facilities for separating the zinc from the dust and produce crude zinc oxide with low commercial value.

The hydrometallurgical processes can produce high-purity metallic zinc or zinc oxide in comparison with the pyrometallurgical method but most of them cannot completely leach zinc ferrite contained in the dust as a major phase.

Hot acid leaching was found useful to leach zinc ferrite particles in EAF dusts. There has been growing trends to utilize commercially the processes for extracting sulfuric acid and zinc from ZnS, and many methods have been suggested in regard to leaching and extracting zinc from EAF dusts with sulfuric acid.

However, most processes using sulfuric acid require high temperature and high-pressure conditions in order to avoid jarosite formation. Another disadvantage is leaving harmful elements, lead, cadmium and copper, unleashed. Furthermore, in the zinc electrodeposition processes from a sulfuric solution, EAF dusts normally contain a few percent of the noxious chloride which should be removed for the following zinc extraction stage due to aggressive behavior to anode materials in sulphate system.

Compared with sulfuric acid, hydrochloric acid was found as a very effective lixivant to leach zinc ferrite from EAF dusts with high zinc yield and without jarosite formation.

Hydrochloric acid has chemical activity 4–10 times as high as sulfuric acid of the same concentration and is widely used as a very appropriate leaching reagent because its activity increases with the increase in the concentration. The hydrochloric acid advantageously generates no jarosite that is difficult to eliminate.

That is, the processes using hydrochloric acid can leach more than 90% of zinc within short time at low temperatures with high leaching efficiency and can leach almost all heavy metals. The processes also allow the size of a reactor to be smaller due to high saturation degree of zinc and to extract iron in the form of ferric oxide. Furthermore, the processes using hydrochloric acid can be used irrespective of metal salts existing in EAF dusts.

Accordingly, requirements for collecting zinc from EAF dusts with hydrochloric acid are as follows: (1) the hydrochloric acid reagent should be recycled economically with high yield for the purpose of practical use of the combination of the processes comprising leaching and electrolytic extraction; (2) the product thus obtained should be valuable with the least harmful residue to compensate the disposal expenses ; and, (3) the system should be safe and simple but not occupy much space.

U.S. Pat. No. 4,572,771 discloses a method for leaching the EAF dusts in a 75–200 g/l HCl solution associated with an electrolytic extraction cell of a sulfuric acid system using an organic solvent extraction technology.

U.S. Pat. No. 4,610,722 discloses a method for leaching the EAF dusts with a mixed solution of sulfuric acid and hydrochloric acid and the subsequent solvent extraction technology.

U.S. Pat. No. 5,336,297 involves a method for leaching the dusts with a ferric chloride solution under high temperature and high pressure conditions to extract hematite and then using a solvent extraction technology.

U.S. Pat. No. 5,709,730 involves a method for leaching the dusts with a mixed solution of calcium chloride and hydrochloric acid and then collecting hydrochloric acid with sulfuric acid to produce gypsum.

The above-mentioned patents employ the solvent extraction technologies. However, trial experiments performed to examine the economical or technical feasibility of the patented methods revealed that the patents were disadvantageous in that the system concerned occupies much space and requires a large installation expense.

SUMMARY OF THE INVENTION

Accordingly, an object of the present invention is to provide a method for extracting high purity hydrochloric acid and zinc from an impure zinc chloride solution and, specifically, a method for extracting hydrochloric acid and zinc from electric arc furnace dust containing zinc ferrite by purification using active carbon and zinc powder, directly extracting hydrochloric acid with a cation exchange membrane, and eliminating chlorine gas generated during electrodeposition with active carbon.

To achieve the first object of the present invention, there is provided a method for extracting hydrochloric acid and zinc from EAF dusts containing zinc ferrite including the steps of: (a) hot acid leaching of solids remaining in a neutral leaching step using a mixed solution of hydrochloric acid collected from an electrolytic extraction cell (electrowinning cell) and zinc chloride, to prepare a zinc chloride solution; and (b) neutral leaching by adding new dust to eliminate iron dissolved in the hot acid leaching and introducing air and oxygen generated from the electrolytic cell.

According to the present invention, there are included a first purification step using zinc oxide for eliminating a small amount of iron existing after the neutral leaching, a second purification step using active carbon for eliminating organic matters dissolved in the dust, and a third purification for eliminating Pb, Cu and Cd through cementation.

The present invention includes an electrodeposition step for electrolytic extraction of zinc from the purified solution. The electrodeposition step is performed in a cell having a cation exchange membrane. The present invention further includes a chlorine gas eliminating step for passing the purified solution through a heating unit for removing the solution of chlorine gas generated from an anode of the electrolytic cell. From the electrolytic cell is discharged an electrolyte having acidity of 1–2N HCl suitable for hot acid leaching.

Furthermore, the present invention decomposes an organic metal complex deteriorating current efficiency and uses zinc powder for eliminating other heavy metals through cementation.

Zinc and hydrochloric acid are collected from the purified solution in an electrodeposition chamber using the cation exchange membrane. The current density for this process is 300–1000 $A/m^2$ for the cation exchange membrane and 750–2000 $A/m^2$ for the cathode. Usually, the membrane current density is higher than the cathode current density.

An electrolyte contains 50–130 g/l Zn and 0–40 g/l hydrochloric acid (except for zinc chloride) and the used electrolyte contains 104–270 g/l Zn and 37–74 g/l hydrochloric acid (except for zinc chloride).

The electrodeposition chamber has a structure with cathodes and anodes alternately arranged. The anode is of a tabular structure surrounded by the cation exchange membrane. A 1–2N sulfuric acid solution is introduced into the anode to cause generation of oxygen and about 2% of hydrochloric acid is lost during the electrodeposition. In order to eliminate chlorine generated during the electrodeposition, an anode solution discharged from the electrolytic cell is heated to above 90 degree Celsius to vaporize the chlorine and introduced into the electrolytic chamber again.

According to the above-described zinc extraction method, the present invention uses hydrochloric acid and a zinc chloride solution for leaching in order to reuse the electrolyte discharged from the electrolytic extraction cell as a lixivant. As well known, the leaching rate of zinc ferrite largely depends on the hydrogen activity of the solution and an increase in the zinc chloride concentration increases the hydrogen activity in the aqueous chloride solution. In the present invention, the acidity is maintained below 2N that is enough to leach 100% of zinc ferrite particles.

According to several experimental tests for zinc chloride electrolysis, the present invention has economical feasibility with regard to disposal of the dust in that one membrane cell is selected to reduce the costs of membrane and prevent additional power consumption in an anion exchange membrane.

A BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings.

A DETAILED DESCRIPTION OF PREFERRED EMBODIMENTS

Hereinafter, the present invention will be described in detail with reference to the accompanying drawings.

Figure 1:
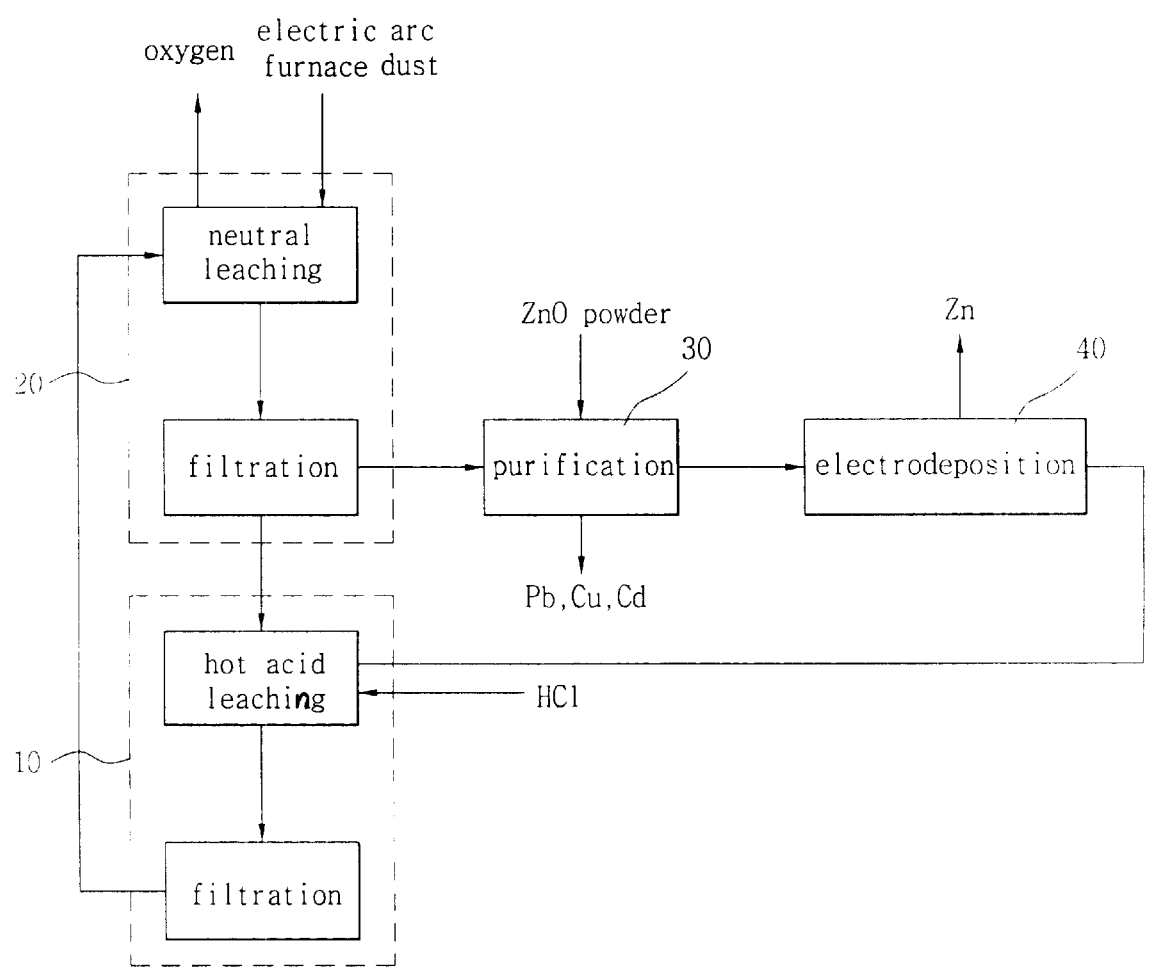
FIG. 1 is a diagram illustrating an entire process for extracting hydrochloric acid and zinc according to the present invention.

FIG. 1 is a diagram illustrating the entire process for collecting electric arc furnace dust in accordance with an embodiment of the present invention.

In recycling EAF dust, as shown in FIG. 1. a two-stage leaching process was designed for complete zinc extraction from the dust by counter flow leaching between the dust and the leaching agent. The two leaching steps are hot acid leaching step 10 and neutral leaching step 20. The neutral leaching step 20 uses a solution obtained by the hot acid leaching step 10 in leaching new dust, the new dust being introduced into the solution from the hot acid leaching to remove iron from the solution and to increase the zinc concentration in the solution.

Solids produced in the neutral leaching step 20 are transferred to a hot acid leaching container that maintains the internal temperature of above 80 degree Celsius under the atmospheric pressure. In the hot acid leaching container, the solids including zinc ferrite as a principal component are leached with a solution of zinc chloride in hydrochloric acid. In regard to the hot acid leaching step 10, a 1.0–2.0N HCl solution has been found to be suitable for leaching 90% of zinc at 90 degree Celsius.

Complete leaching of zinc ferrite can be ascertained by analyzing the leaching residue. For example, after the neutral leaching step 20, 50 g of solids are leached out by 100% in 500 ml of a 2N HCl solution at 90 degree Celsius within 2–6 hours. However, the Zn yield is less than 80% when using a less than 1.0N (i.e., 0.5N) HCl solution, although the ratio of steel powder to acid is 1:1. It comes to the conclusion that at least 1N HCl should be used for hot acid leaching. Less than 2N HCl can be obtained from an electrolytic cell.

It is impossible to eliminate iron completely in the hot acid leaching step 10 because a considerable amount of iron is dissolved in the hot acid leaching step 10. The dissolved iron can be eliminated using zinc oxide in the neutral leaching step 20. Zinc is difficult to leach out completely from zinc ferrite. The one reason of the difficulty is that iron is much dissolved and accordingly a larger amount of new dust or zinc oxide is required to neutralize and deposit the iron. Furthermore, usage of an excess of hydrochloric acid is disadvantageous. Another difficulty in leaching zinc completely lies in that the hydrochloric acid collected from the electrolytic cell is considerably low in concentration. The HCl concentration is limited to 1–2N for an economical reason, in which case the acid does not need to concentrate. An analysis of the leaching residue after the hot acid leaching step 10 reveals that the iron exists in the form of hematite and geothite and the filtrate is within the range of pH 0.0–2.0.

The solution obtained in the hot acid leaching step 10 contains ferrous chloride, ferric chloride, zinc chloride, hydrochloric acid, and other metal chlorides and falls within the range of pH 0.0–2.0. The solution is maintained at above pH 4.0 in order to remove iron from the solution, and the solution is then subjected to the neutral leaching step 20 of adding new dust to increase the Zn concentration.

This new dust was introduced into the iron containing solutions until the pH reached 4.0. Ferric ion easily precipitates in the pH range of 4.0 to 5.0, but ferrous ion remains stable. Therefore, the oxidation of ferrous ion is necessary to precipitate in the solution.

Aeration by air or oxygen is a practical and economical method to oxidise ferrous ion but makes it difficult to find quantitative understanding about the oxidation reaction.

Hydrogen peroxide is a very effective oxidizing agent and makes easy to understand the stage of completion. Introduction of hydrogen peroxide decreases the pH due to the production of hydrogen ion as the result of the formation of ferric hydroxide of FeO.OH.

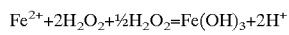

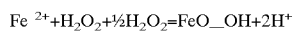

The pH dropped abruptly with introduction of hydrogen peroxide at the initial stage of reaction where there was considerable amount of ferrous ion. As the reaction reached completion of iron precipitation, the change in pH became insignificant. Finally, the change did not occur with more addition of hydrogen peroxide. As described above, hydrogen peroxide is useful for understanding the degree of oxidation of the dusts. Accordingly, an instant sampling from the vessel to check the yield by testing with hydrogen peroxide solution is very useful for the operator.

However, the solution undergoes a purification step 30 for further purification because the iron removal from the neutral leaching is not sufficient for the electrolysis. It is required to add great amount of oxidizing agent in order to decrease the Fe concentration below 100 ppm. Therefore, to operate an electrolytic extraction cell safely, zinc has to be collected in an electrodeposition step 40 subsequent to the purification step 30.

Figure 2:
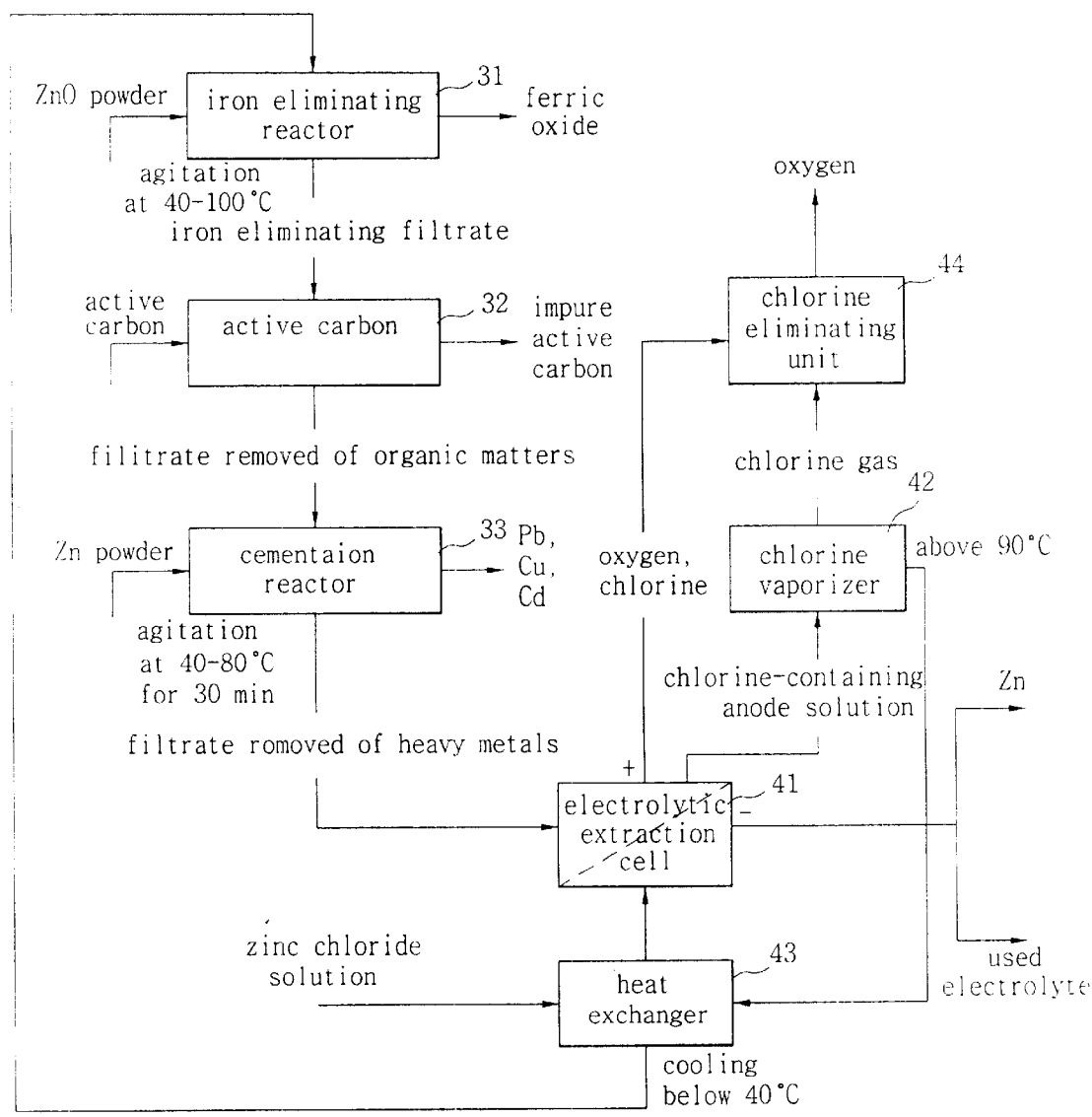
FIG. 2 is a detailed diagram illustrating a process for purification and electrolytic extraction of FIG. 1; and, FIG. 3 is a cross-sectional view of an electrodeposition chamber according to an embodiment of the present invention.

FIG. 2 is a detailed diagram illustrating a process for purification and electrodeposition according to the present invention.

Referring to FIG. 2, in the purification step 30, zinc oxide is added to an iron eliminating reactor 31 so as to deposit iron. Excess addition of zinc oxide is not disadvantageous to the purification step, since the solution becomes a buffer solution at predetermined pH and only iron can be eliminated almost completely without varying the Zn concentration.

The electric arc furnace includes a preheating chamber for the combustion of scrap metals prior to introduction in EAF. In the preheating chamber, organic materials, which is originated from the combustion of organic coatings on the scrap metals and may seriously deactivate the cementation processes, is burnt. As the temperature of the preheating chamber is about 700 degree Celsius, it is possible to make incomplete combustion products like dioxins and aldehydes that are soluble in water but removable inside of EAF operating at much higher temperature. The removal of other impurity or heavy metals by cementation was not successful due to the presence of the metal-organic complexes that are difficult to precipitate by zinc powder. Current efficiency was found low by hydrogen evolution due to lowered hydrogen overpotential on the sites deposited by C, Pb and Cu. Such a situation could be alleviated by removing deposits formed in initial period in which massive deposition of impurity metals occurred and the current efficiency could reach about 80%. However, because of the low Zn purity of the deposits lower than 99%, an alternative purification should be found.

To remove the organics, activated carbon powder Darco (100–325 mesh, American Norit Co. Inc.) or granules were introduced into the solutions and stirred for 10 minutes in a vessel. The toxic odour and the yellowish tint were instantly disappeared. About 1 g of the activated carbon was enough for 100 ml of the electrolyte to remove the organic. The Zn and Mn concentrations were not affected by the active carbon treatment, while some impurity levels of Pb and Cu decreased significantly. EDS analysis proved the adsorption of Pb and Cu in the activated carbon granules well washed with distilled water after adsorption, but Zn and Mn adsorption were not detected. It was found that adsorption of zinc species on activated carbon was very dependent on pH. At low pH value than 4.0, the adsorption of zinc is very low. Accordingly, in this process, the activated carbon treatment was conducted at low pH <4.0. After the treatment, cementation stage was followed and the resulting impurity levels were acceptable for the electrolysis.

The residue from the neutral leaching is transferred into an electrolytic extraction cell(extrowinning cell) 41 for the electrodeposition step 40, the cell 41 being operated above 80° C., but at atmospheric pressure. In the hot acid leaching vessel, the hydrochloric acid plus zinc chloride solution reacts with the leaching residue containing zinc ferrite as a major zinc-containing phase. At this stage, 1.0–2.0 N HCl solutions were found enough for Zn yield higher than 90% at 90 degree Celsius. A complete dissolution of zinc ferrite was found by residue analysis when 50 g of the residue from neutral leaching was dissolved in 500 ml of 2N HCl solution. However, the leaching at 90 degree Celsius for 2–6 hours, below 1.0 N HCl with a same ratio of dust to acid, much lower Zn-yield less than 80% resulted. Therefore, the solution for the hot acid leaching should have at least 1N HCl. This invention limits the maximum acidity, that is free HCl content, is 2N which can be easily recycled from the electrolysis cell.

In the hot acid leaching stage, a considerable dissolution of Fe occurs. Iron removal cannot be achieved in the hot acid leaching stage only. This process has a flexibility of allowing iron dissolution to an acceptable level because iron chloride can be used to leach new ZnO particles in the neutral leaching stage. The complete leaching of zinc ferrite is not advantageous because of high concentration of ferric chloride that should be removed from the solution by new dust or by other neutralising agents. In addition, the excessive use of HCl increases the cost. Another reason is the low HCl concentration returned from electrolysis. For economical reasons, the concentration of leaching solutions was limited to about 1–2N HCl, which doesn't need any acid-concentrating unit.

The iron in the residue from the hot acid leaching was found in the form of hematite and geothite. The filtrate from the hot acid leaching had a low pH less than 2.0 and high content of iron chlorides.

Figure 3:
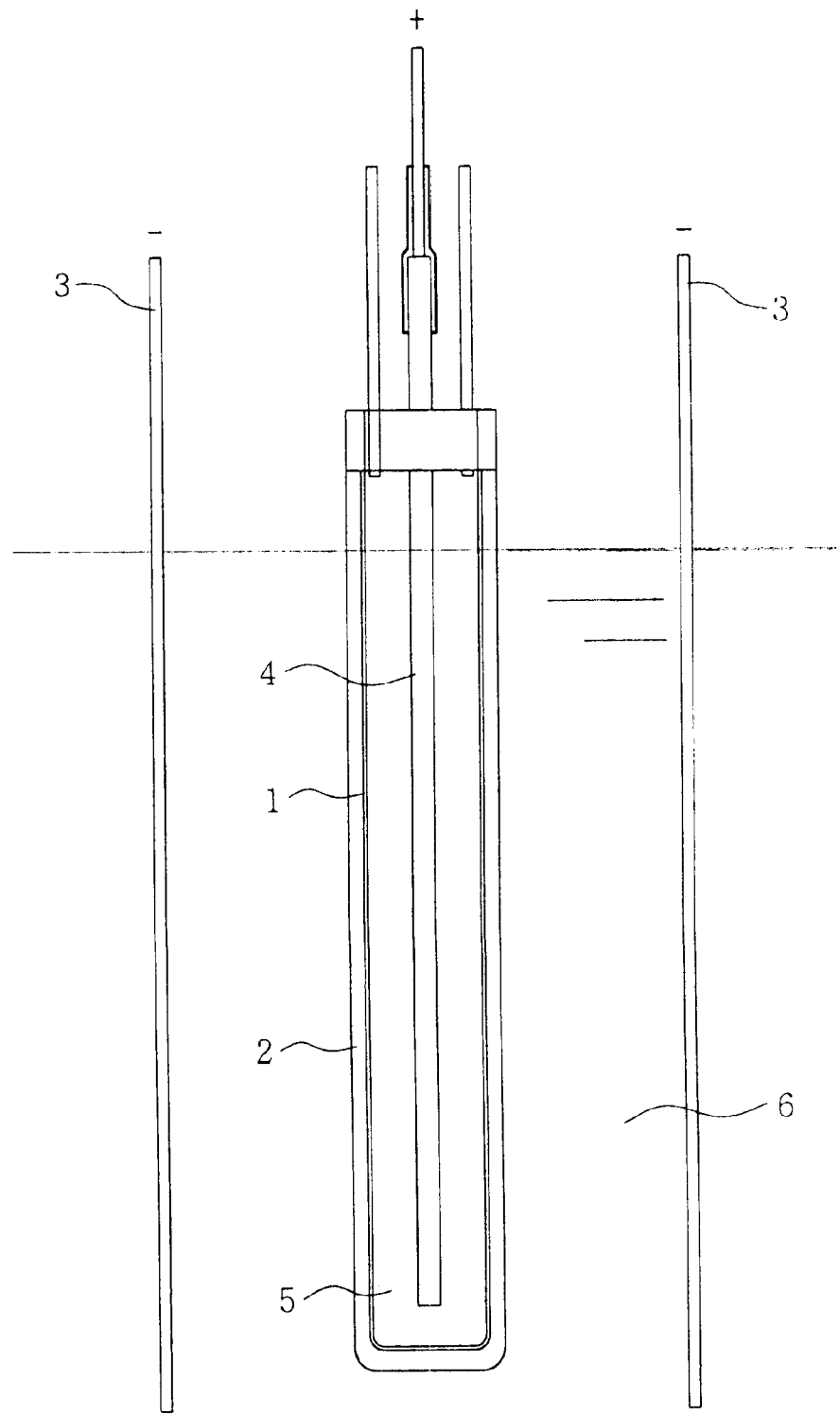

Referring to FIG. 3, the purified solution containing zinc chloride is transferred into the electrowinning cell. The cell was equipped with ion exchange membranes producing HCl, minimizing $Cl_2$ evolution. Electrolysis was conducted in a rectangular cell that consisted of two compartments separated by a cation exchange membrane 1 (Naflon®-117), mechanically supported by two perforated Teflon plates 2. The cathode 3 was commercial purity (99%) aluminum plates and the anode 4, Pt-coated or $RuO_2$-coated titanium plates. The distance between the two electrodes was 4.5 cm. The anolyte compartment was filled with 1.0–2.0M sulphuric acid 5, and the catholyte compartment with zinc chloride solution 6. Air sparging was done from the bottom of the catholyte compartment.

The cell voltage decreased with solution temperature until 40 degree Celsius, but did not show significant change at higher temperature. The voltage is also dependent on the solution conductivity. The decrease in the voltage was always observed as the electrolysis proceeded with producing highly conducting HCl in catholyte. At 2000 A/m$^2$ and 40 degree Celsius, the power consumption was about 4.9 kWh/kg-Zn, but at 300 A/m$^2$ and 40 degree Celsius, it was 2.7 kWh/kg-Zn that is similar to the electrolysis in sulphate system.

It was found that current efficiency has a relationship with hydrogen activity and Zn concentration. At high pH region, the current efficiency exhibited higher than 90% even at low Zn concentration of about 20 g/l. However, in order to obtain enough acidity for leaching and for reducing electrical loss due to the solution resistance, the electrolysis should run at high activities of $Zn^{2+}$ and $H^+$. At least 50 g/l of Zn is needed to ensure high efficiency in the range of 1.0–2.0 of hydrogen activity. The maximum bound for the Zn concentration in catholyte is determined by the reason that usual cation exchange membrane can not tolerate high acidity of sulphuric acid. In this invention, the maximum concentration of sulphuric acid is limited at most 2 M $H_2SO_4$. Because the ionic concentration should be balanced both in catholyte and in anolyte due to the osmotic pressure developing, the zinc chloride concentration should be less than 2M $ZnCl_2$. Therefore, Zn concentration is in the range of 50 g/l to 130 g/l in this invention.

The high current efficiency of about 95% was obtained in the range of 300 to 2000 $Am^{-2}$ of cathodic current densities (150 to 1000 $Am^{-2}$ of membrane current density). It is advantageous that this process doesn't need any additives for increasing the current efficiency. Eventually the spent electrolyte without any organic additive is much more useful as a lixivant.

The resulting zinc deposit has a high purity of 99.95% Zn but also contains, i.e., Fe, 0.006%, Mn, 0.0004%, Cu <0.0001% and Pb 0.008%. An investigation about the morphology of the coatings showed the difference according to the cathodic current density. Air sparging from the bottom of cathodes was essential for suppressing dendritic growth. However, the structure formed at 2000 $Am^{-2}$ shows a porous and nodular appearance. The deposits obtained at 300–1000 A/m$^2$ have dense surfaces. Accordingly, higher cathodic current density than 1000 A/m$^2$ is unfavourable for densifying the deposit. Another important reason for avoiding high cathodic current density is due to the high voltage developed by solution resistance linearly increasing with the current density. In this configuration of the cell, about 1000 A/m$^2$ for the cathode is a maximum value to achieve an acceptable value, that is, 4.0 kWh per kg of Zn.

Assuming the evolution rate of chlorine gas is the same as the chloride transport rate to anolyte, the loss of HCl in electrowinning calculated from the chloride measurement was below 2%. The transport numbers of chloride ions were obtained by measuring slopes of $Cl^-$ molar concentration versus time below $5 \times 10^{-3}$ M chloride concentration. Practically no chlorine odour was detected below this range during electrolysis. It was observed that the transport numbers of $Zn^{2+}$ and $Cl^-$ in anolytes are decreasing as membrane current density increases. In order to reduce chloride migration to anolyte, the higher current density is more advantageous. From 750 A/m$^2$ of membrane current density, the transport number of $Cl^-$ decreased to 1%, therefore, higher than 750 A/m$^2$ of is preferred.

Treatment of the chlorine gas generated is another problem that should be addressed. A possible method is circulating the anolyte to a heating unit (42 in FIG. 2) to evaporate chlorine gas from the solution higher than 90 degree Celsius. At 90 degree Celsius, the solubility of chlorine gas is 0.127%, and at 100 degree Celsius, 0.000%. The heat of the anolytes may be exchanged through a heat exchanger (43 in FIG. 2) by contact with impure zinc chloride solution from neutral leaching. Chlorine removal units (44 in FIG. 2) such as neutralizing with NaOH, $NH_4OH$ and $Na_2CO_3$ or adsorption by activated carbon can be routes for the safer treatment.

The more important problem is the high cost for the ion exchange membrane. It is economically advantageous to select high current density for membranes because decreasing current density does not elongate the lifetime of membranes. Electrolysis tests adapting smaller membrane area than cathode were found more useful than in the previous cell. The edge effect of the cathode exhibiting long dendrites grown on the edges, despite of the air sparging action, was inevitable in case of using the smaller cathode area, but could be eliminated using the larger cathode area. Utilising the advantages of high current density of membrane, the lowered current density in the solutions and electrodes significantly decreased the cell voltage.

An optimal value can be determined by estimating the high maintenance cost for the electrolysis cell and the advantage of reduced electrowinning units. Some part of zinc can be lost in the anolyte when the zinc concentration in the anolyte is low. Several experiments with anolyte having 1M zinc sulphate and 1M sulphuric acid, and catholyte having 2M zinc chloride exhibited a decrease in zinc concentration in anolyte with time. Accordingly, the zinc concentration in the anolyte should be kept high enough to prevent the migration to anolyte.

From electrolysis trial results using synthetic zinc chloride solutions and purified solutions from the leaching EAF dusts, it was found that final acid concentrations were about 1.4 M HCl suitable for the hot acid leaching.

EXAMPLE

Table 1–Table 4 illustrate the performance of the present invention in benchscale tests on two types of electric arc furnace dusts analysed as shown in Table 1.

TABLE 1

Chemical compositions and phases of EAF dusts (wt %)

| Element | EAFD-1 | EAFD-2 |
|---------|--------|--------|
| Zn | 15.9 | 26.7 |
| Fe | 37.7 | 32.3 |
| Pb | 1.85 | 3.16 |
| Mn | 1.16 | 0.94 |
| Ca | 0.73 | 3.64 |
| Cr | 0.28 | 0.11 |
| Mg | 0.16 | 0.55 |
| Cu | 0.30 | 0.20 |
| Ni | 0.03 | 0.01 |
| Cd | 0.02 | 0.03 |
| As | 0.00 | 0.13 |
| Al | 1.12 | 0.39 |
| Na | 2.27 | 1.54 |
| K | 3.02 | 2.20 |
| Si | 1.83 | 1.13 |

TABLE 1-continued

Chemical compositions and phases of EAF dusts (wt %)

| Element | EAFD-1 | EAFD-2 |
|---|---|---|
| Cl | 6.14 | 4.18 |
| S | 0.55 | 0.62 |

Table 2 depicts the mass balance of the leaching and purification to make electrolyte solution in case of using EAFD-1 that doesn't have any burnt organic. In convenience, the test started from hot acid leaching stage.

TABLE 2

Mass balance in leaching and purification stages. Residues are analysed by dissolving in hot aqua regia.

| Stage | Input/output materials | Compositions |
|---|---|---|
| Hot leaching | acid Input materials | EAFD-1 50 g<br>$ZnCl_2$ 68.15 g + HCl 18.5 g; 500 ml solution |
| | Filtrate | 500 ml<br>Zn 78,500 ppm (Zn yield: 82%)<br>Fe 960 ppm |
| | Residue | 29.8 g<br>(Zn: 4.7%, Fe: 61.5%) |
| Neutral leaching | Mass of new EAFD-1 | 56.2 g |
| | Mass of 29% hydrogen peroxide used in neutral leaching | 5.76 g |
| | Filtrate from neutral leaching, Metal (ppm) | 560 ml<br>Zn 78,330 (Zn yield: 44.5%)<br>Fe 0.5<br>Cu 27<br>Pb 90<br>Mn 82 |
| | Residue | 50.3 g<br>(Zn: 11.5%, Fe: 43.0%) |
| Purification | Zn dust (g) for purification | 2.0 g |
| | Purified solution, Metal (ppm) | 567 ml<br>Zn 79,000<br>Fe <0.5<br>Cu 0.12<br>Pb 0.6<br>Mn 79 |

The resulting solution has zinc concentration suitable for the electrowinning. Another test for EAFD-2 containing organic needed activated carbon treatment. Table 3 shows the effect of the purification method by activated carbon.

TABLE 3

Comparison among purification methods.

| Stages | Method | Metal concentration (ppm) | |
|---|---|---|---|
| 1. Impure stock solution after ZnO treatment | Filtrate from neutral leaching of EAFD-2 | Zn<br>Fe<br>Pb<br>Cu<br>Mn | 50,000<br>1.0<br>730<br>190<br>680 |
| 2. Cementation | Addition of 10 g of Zn powder to 1000 ml.<br>The removal of Pb is not perfect. | Zn<br>Fe<br>Pb<br>Cu<br>Mn | 50,000<br>1.0<br>110<br>n.d.<br>580 |
| 3. Activated carbon treatment | 15 g of active carbon granules (Aldrich) to 1000 ml of solution 1 | Zn<br>Fe<br>Pb<br>Cu<br>Mn | No change<br>1.0<br>450<br>6.56<br>No change |
| 4. Activated carbon treatment + Cementation | Addition of 10 g of Zn powder to solution 3 | Zn<br>Fe<br>Pb<br>Cu<br>Mn | No change<br>1.0<br><2<br><2<br>No change |

From the results shown in the Table 3, it is found that Mn and Zn are not affected by activated carbon treatment while Pb and Cu decrease their concentrations. With cementation only, Pb could not be removed below 100 ppm because the metal-organic complex cannot be separated by ion exchange. Perfect purification was achieved in case of using both of two methods.

Table 4 shows the electrowinning trial results. Zn concentrations were measured by atomic absorption spectroscopy. Acidity was measured by titration with 0.5 M sodium carbonate solution. The chloride concentration in the anolyte was measured by chloride ion selective electrode—Ionplus Orion 9617BN.

TABLE 4

Electrolysis trial results.

| | |
|---|---|
| Electrolyte (initial, catholyte) | 204 g/l $ZnCl_2$, $<10^{-3}$ HCl |
| Electrolyte (spent, catholyte) | 98 g/l $ZnCl_2$, 52 g/l HCl, |
| Final $Cl^-$ conc. in anolyte | 0.385 g/l |
| Current density | 500 A $m^{-2}$ (cathode)<br>1000 A $m^{-2}$ (membrane, Nafion ®-117) |
| Electrode materials | Anode: Pt or $RuO_2$-coated titanium<br>Cathode: aluminium |
| Inter-electrodes distance | 45 mm |
| Temperature and time | <40 □, 6 hours |
| Cathode current efficiency | 95% |
| Energy consumption | 3.5 kWh/kg Zn |
| Deposit quality | Dense |

The combination of leaching by HCl and electrowinning in chlorides bath is an efficient process for treating the EAF dusts with a high Zn yield and high recovery rate of HCl. Mixing HCl with $ZnCl_2$ leads to higher hydrogen activity in aqueous solution. Unlike the previous patent, U.S. Pat. No. 4,572,771 by Duyvesteyn et al. Using high HCl concentration 75 g/l–200 g/l, the present invention claims 37 g/l–74 g/l recyclable directly from electrolysis cell and safe, nevertheless, enough to leach zinc ferrite completely. Accordingly, high $ZnCl_2$ concentration in the leaching agent is allowed unless the filtration difficulty arises. The analysis for the leaching residue proved that more than 90% of other heavy metallic elements (Pb, Cu, Cd) were extracted when the Zn leaching yield exceeded 90%. About 2–4% of chlorine gas with remaining oxygen (98–96%) will be produced in the electrolysis cell.

The reagent loss is less than other competitive processes. In sulphate based process, the loss of sulphur is from the great quantity of insoluble sulphur containing phases such as $CaSO_4$, $PbSO_4$ and jarosite in leaching residues. In ammonium chloride based process, the loss of ammonia by electrolytic decomposition producing nitrogen gas in the electrowinning is considerable. The blowing of ammonia gas into the cell needs cost for the additional unit. However, one drawback in this chloride-based process, for installing ion-exchange membrane can be improved by introducing high current density for the membrane and low current density for the cathode. Great advantages due to the simplified process with direct regeneration of HCl by electrolysis leads to a motivation for commercialisation.

As described above, the present invention for extracting zinc from the EAF dusts with hydrochloric acid provides the following advantages:

(1) Chemical activity coefficient of HCl in 0.5–5 N aqueous solution does not decrease greatly with increasing acid concentration as that found with $H_2SO_4$. The leaching rate is strongly dependent upon the activity of acid. Higher Zn yield is expected using low acid concentration.

(2) The chlorides contained in the dusts are beneficial to the leaching process by saving HCl. As usual, the dusts contain 2–8% of chloride ion. Washing the dust to remove chlorides is not needed.

(3) Toxic elements like Pb and Cd can be removed from the dust dissolving as chlorides.

(4) Jarosite, environmentally harmful and large in quantity as a residue, can be avoided.

(5) In general, solid-liquid separation by filtration in chloride system is easier than in sulphate system.

(6) In aqueous solution, chlorides and hydrochloric acid have the higher equivalent conductivities than sulphates and sulphuric acid, which reduces cell voltage in electrolysis.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A process for the leaching of electric arc furnace dust comprising a mixture of zinc, iron and lead oxides, the process comprising the steps of:

leaching the dust with a leach solution containing hydrochloric acid and zinc chloride; and electrowinning of metallic zinc;

wherein said leaching is carried out at a temperature of at least 80 degree Celsius and with concentrations of 37 g/l–74 g/l HCl and 104 g/l–270 g/l ZnCl2.

2. The process according to claim 1, further comprising the steps of:

dissolving zinc present in the dust during said leaching with said leach solution to provide a solution of zinc chloride; and removing iron from the solution by neutral leaching.

3. The process according to claim 2, wherein said neutral leaching is carried out by addition of new dust until pH of the solution reaches higher than 4.0.

4. The process according to claim 2, wherein said neutral leaching is enhanced by air or oxygen blowing from the bottom of the vessel.

5. A process for the leaching of electric arc furnace dust comprising a mixture of zinc, iron and lead oxides, the process comprising the steps of:

leaching the dust with a leach solution containing hydrochloric acid and zinc chloride;

electrowinning of metallic zinc, dissolving zinc present in the dust during said leaching with said leach solution to provide a solution of zinc chloride; and removing iron from the solution by neutral leaching;

wherein said iron removal in neutral leaching is identified by hydrogen peroxide test.

6. The process according to claim 5, wherein said hydrogen peroxide test is conducted by dropping of hydrogen peroxide solution to the small sample of the solution.

7. A process for the leaching of electric arc furnace dust comprising a mixture of zinc, iron and lead oxides, the process comprising the steps of:

leaching the dust with a leach solution containing hydrochloric acid and zinc chloride;

electrowinning of metallic zinc;

dissolving zinc present in the dust during said leaching with said leach solution to provide a solution of zinc chloride;

removing iron from the solution by neutral leaching; and purifying the solution by zinc oxide powder and by activated carbon granules.

8. The process according to claim 7, wherein the amount of said zinc oxide powder for purification is 1–50 g per 1 litre solution to precipitate iron from the solution after neutral leaching in the from of ferric hydroxide and FeOOH.

9. The process according to claim 7, wherein the amount of said activated carbon granules for purification is 1–20 g per 1 litre solution to remove organics or metal-organic complexes from the solution.

10. The process according to claim 9, further comprising a cementation step to precipitate lead, copper, and cadmium to make a purified solution for yielding high purity metallic zinc in a subsequent electrolysis step.

11. The process according to claim 10, further comprising the step of electrowinning of zinc from the purified solution.

12. The process according to claim 11, wherein said electrowinning comprises the step of electrolysing the purified solution having a concentration of 50–130 g Zn/litre, wherein the electrolysis step is performed in an anode compartment and a cathode compartment and further performed at below 40 degree Celsius with a current density exceeding 300 A/m2, thereby yielding coherent zinc at the cathode.

13. The process according to claim 12, wherein the electrolysis was conducted in a cell with a cation exchange membrane to directly regenerate hydrochloric acid from the cell.

14. The process according to claim 13, wherein the size of the membrane is designed to have smaller exposed area to the electrolyte solution than the size of cathode.

15. The process according to claim 13, wherein the current density of the cathode and the membrane are in the range of 300–1000 A/m2 and of 750–2000 A/m2 respectively.

16. The process according to claim 12, wherein the anode compartment was filled with 1–2M sulphuric acid solution.

17. The process according to claim 16, wherein the sulphuric acid solution is circulating through a heating chamber maintained at 90–100 degree Celsius to remove chlorine.

18. The process according to claim 12, wherein the leach solution has the acidity of higher than 1N HCl without any acid concentrating stage.

19. A process for the treatment of electric arc furnace dust comprising a mixture of zinc, iron and lead oxides, the process comprising the steps of:

reacting the dust with hydrochloric acid—zinc chloride solution at a predefined temperature to dissolve lead and zinc present in the dust to form a solution containing zinc chloride and lead chloride;

removing iron from the solution by addition of new dust;

removing of metal and impurities by activated carbon and cementation; and, electrowinning of zinc from the solution.

\* \* \* \* \*